(12) United States Patent  
Mukugaichi

(10) Patent No.: US 6,578,803 B2
(45) Date of Patent: Jun. 17, 2003

(54) SEAT ELEVATION ADJUSTER AND AN ACTUATOR MECHANISM FOR USE IN THE SAME

(75) Inventor: Tomonori Mukugaichi, Osaka (JP)

(73) Assignee: Delta Kogyo Co., Ltd., Aki-gun (JP)

( * ) Notice: Subject to any disclaimer, the term of this patent is extended or adjusted under 35 U.S.C. 154(b) by 0 days.

(21) Appl. No.: 09/893,539

(22) Filed: Jun. 29, 2001

(65) Prior Publication Data

US 2002/0000502 A1 Jan. 3, 2002

(30) Foreign Application Priority Data

Jun. 30, 2000 (JP) ........................................ 2000-197700

(51) Int. Cl.$^7$ ................................................ B60N 1/02
(52) U.S. Cl. ...................... 248/157; 248/421; 248/422
(58) Field of Search ................................ 248/157, 419, 248/421, 422, 423

(56) References Cited

U.S. PATENT DOCUMENTS

| 4,616,876 A | * | 10/1986 | Suzuki et al. ............... 297/328 |
| 4,720,070 A | * | 1/1988 | Nishino ...................... 248/394 |
| 4,834,333 A | * | 5/1989 | Saito et al. .................. 248/421 |
| 4,903,931 A | * | 2/1990 | Shimazaki .................. 248/421 |
| 5,007,611 A | * | 4/1991 | Kanai .......................... 248/422 |
| 5,865,285 A | * | 2/1999 | Minkenberg et al. ......... 192/15 |
| 5,881,854 A | | 3/1999 | Rougnon-Glasson ........ 192/15 |
| 6,276,650 B1 | * | 8/2001 | Kojima et al. .............. 248/429 |
| 6,422,651 B1 | * | 7/2002 | Muhlberger et al. ... 297/344.12 |

FOREIGN PATENT DOCUMENTS

| DE | 197 26 257 A | 1/1998 |
| EP | 0 173 044 A | 3/1986 |
| EP | 0 235 793 A | 9/1987 |
| EP | 0 857 606 A | 8/1998 |
| FR | 2 750 185 A | 12/1997 |
| JP | 62 275853 A | 11/1986 |

* cited by examiner

*Primary Examiner*—Anita King
*Assistant Examiner*—Steven Marsh
(74) *Attorney, Agent, or Firm*—Smith Patent Office

(57) ABSTRACT

An actuator mechanism includes a attachment member fixed to a seat elevation adjuster and a controlling member placed between a driver member and the attachment member and can rotate together with an actuating lever. The driver member is located between the attachment member and a rotary member and fitted over a center shaft. There is formed a feed projection at one terminal portion of the driver member and its opposite terminal portion is placed face to face with a locking member. When the actuating lever is operated, the controlling member moves the driver member, which causes the locking member and the feed projection to engage with and disengage from the rotary member.

20 Claims, 8 Drawing Sheets

US 6,578,803 B2

SEAT ELEVATION ADJUSTER AND AN ACTUATOR MECHANISM FOR USE IN THE SAME

BACKGROUND OF THE INVENTION

This invention relates to a seat elevation adjuster for adjusting the elevation of a seat, in particular to an actuator mechanism for use in such seat elevation adjuster.

FIG. 8 shows an example of a conventional seat elevation adjuster 200 which is disclosed in Japanese Unexamined Patent Publication No. 62-275853. This seat elevation adjuster 200 comprises a first gear 203 which is supported rotatably about a first shaft 202 at a forward position of a base frame 201 (at left in FIG. 8), a second gear 205 of a smaller diameter than the first gear 203 supported rotatably about a second shaft 204, a connecting rod 207 swingably supported on a crankpin 206 projecting from one side of the first gear 203, and a bell crank 210 whose one end is supported rotatable about a third shaft 208 at a rear end of the connecting rod 207, a central angled end of the bell crank 210 being rotatably supported about a fourth shaft 209.

The second shaft 204 is fitted with an actuating knob 211 which rotates together with the second shaft 204 about its axis. When the actuating knob 211 is turned in forward and reverse directions, its rotating motion is transmitted to the connecting rod 207 through the second gear 205, the first gear 203 and the crankpin 206, and resultant forward and backward movements of the connecting rod 207 cause the bell crank 210 to swing forward and backward about the fourth shaft 209 via the third shaft 208.

A cushion frame 212 supporting an unillustrated seat bottom is connected at its forward part to the base frame 201 by a link rod and a rear end of the cushion frame 212 is joined to the other end of the bell crank 210 rotatably about a fifth shaft 213. Thus, when the actuating knob 211 is turned about the second shaft 204 in the forward and reverse directions, the bell crank 210 turns in its forward and reverse directions about the fourth shaft 209. As a result, the cushion frame 212 is caused to ascend and descend via the fifth shaft 213, whereby the elevation of the seat bottom is adjusted.

When a person is seated on the seat bottom supported by the aforementioned conventional seat elevation adjuster 200, the weight of the person is transmitted to the cushion frame 212, the bell crank 210, the connecting rod 207, the first gear 203 and the second gear 205, and resultant movements of the individual components cause the cushion frame 212 to descend. A previous approach for overcoming this problem is found in Japanese Unexamined Utility Model Publication No. 7-19562, which employs a so-called brake drum placed between the second shaft 204 and the actuating knob 211. This brake drum works in a unidirectional fashion, that is, although the brake drum allows rotational motion of the actuating knob 211 to be transmitted to the second shaft 204, rotational motion of the second shaft 204 is not transmitted in the reverse direction.

The provision of the brake drum of this kind, however, has a problem that it makes the structure of a seat elevation adjuster extremely complex, resulting in an increase in the number of components and in man-hours required for assembly, and an eventual increase in manufacturing cost.

In addition, when the seated person attempts to adjust the elevation of the seat bottom which supports his or her weight, the seated person has to turn the actuating knob 211 by hand a number of times, working against resisting forces produced by his or her own weight. Here, a problem arises that it is not easy for the seated person to adjust the elevation of the seat bottom because a large amount of force is exerted on his or her fingers when turning the actuating knob 211.

SUMMARY OF THE INVENTION

It is an object of the invention to provide a seat elevation adjuster and an actuator mechanism which are free from the problems residing in the prior art.

It is another object of the invention to provide a seat elevation adjuster and an actuator mechanism which are easy to operate and, yet, have a simpler structure.

According to an aspect of the invention, a seat elevation adjuster is provided with a seat support frame for supporting a seat, an elevation mechanism for moving the seat support frame up and down, and an actuator mechanism for actuating the elevation mechanism. The actuator mechanism comprises a rotary member rotatable in the opposite directions about a center axis to actuate the seat elevation adjuster. There are further provided a locking member which is engageable with the rotary member to keep the rotary member from rotating, and disengageable from the rotary member to allow the rotary member to rotate; and a driver member which is rotatable about the center axis, and is movable in a first direction perpendicularly intersecting the center axis and a second direction opposite to the first direction, and is engageable with the rotary member. The driver member makes the locking member to engage with the rotary member, and disengages from the rotary member when moved in the first direction, and makes the locking member to disengage from the rotary member, and engages with the rotary member when moved in the second direction to thereby permit the rotary member to rotate with a rotation of the driver member to actuate the seat elevation adjuster.

These and other objects, features, aspects, and advantages of the present invention will become more apparent from the following detailed description of the preferred embodiments/examples with reference to the accompanying drawings.

DETAILED DESCRIPTION OF THE PREFERRED EMBODIMENTS OF THE INVENTION

Figure 1:
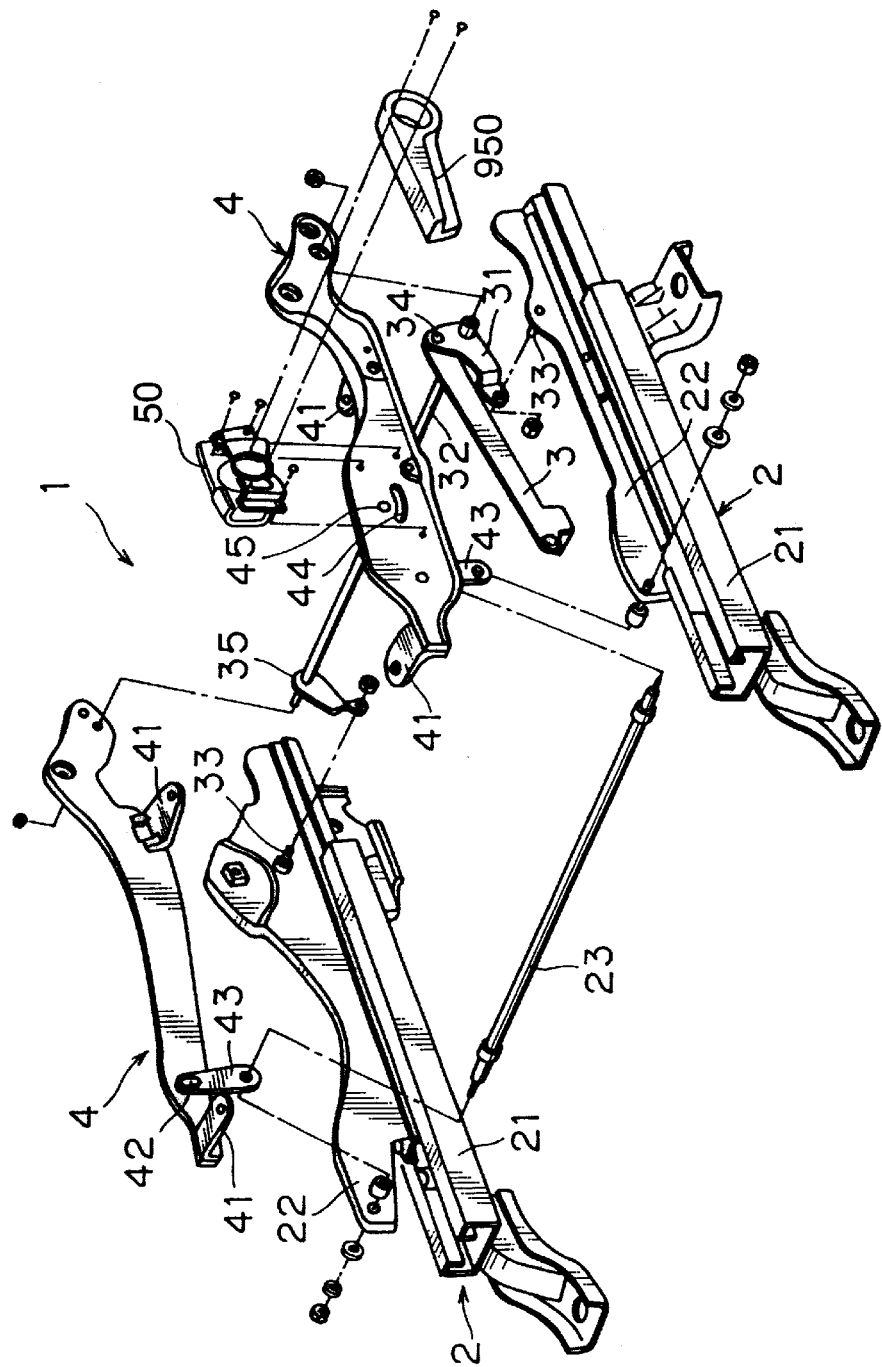
FIG. 1 is an exploded perspective view of a seat elevation adjuster according to an embodiment of the invention.
Figure 2:
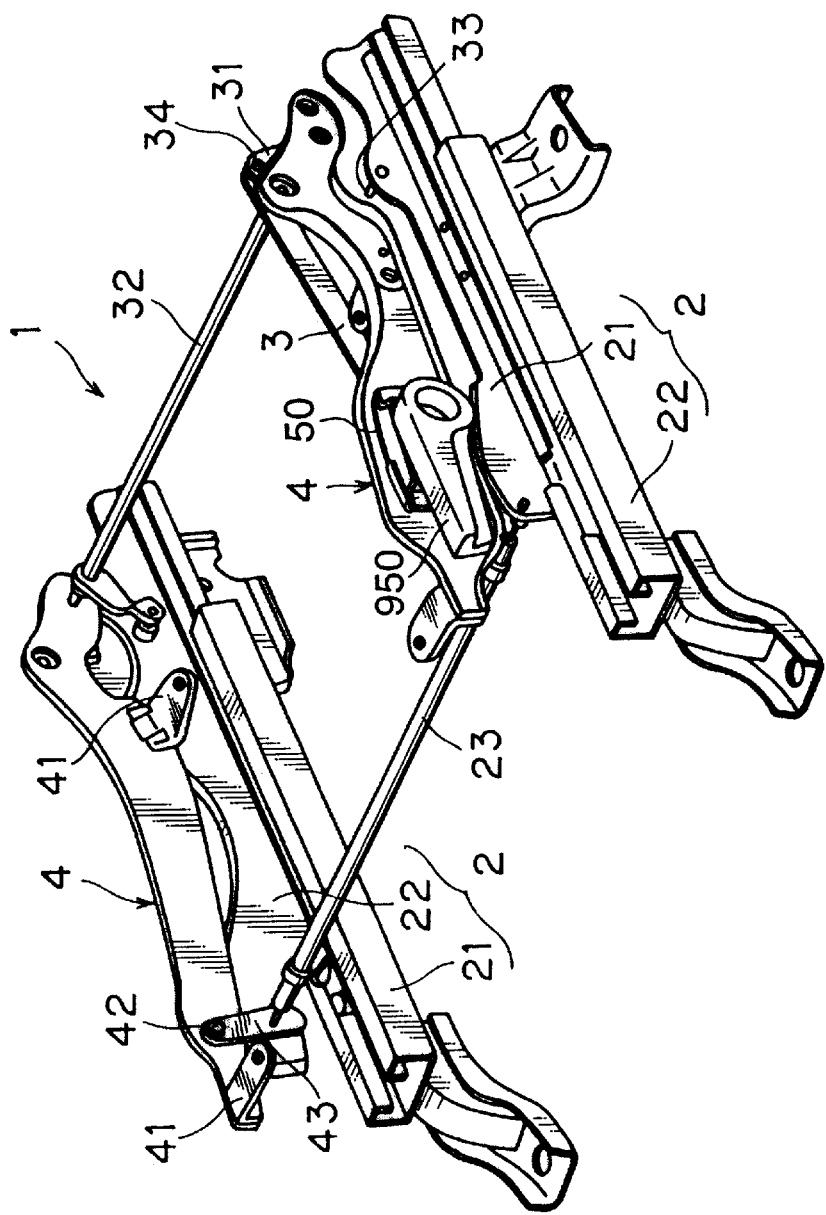
FIG. 2 is a perspective view of the seat elevation adjuster in an assembled state.
Figure 3:
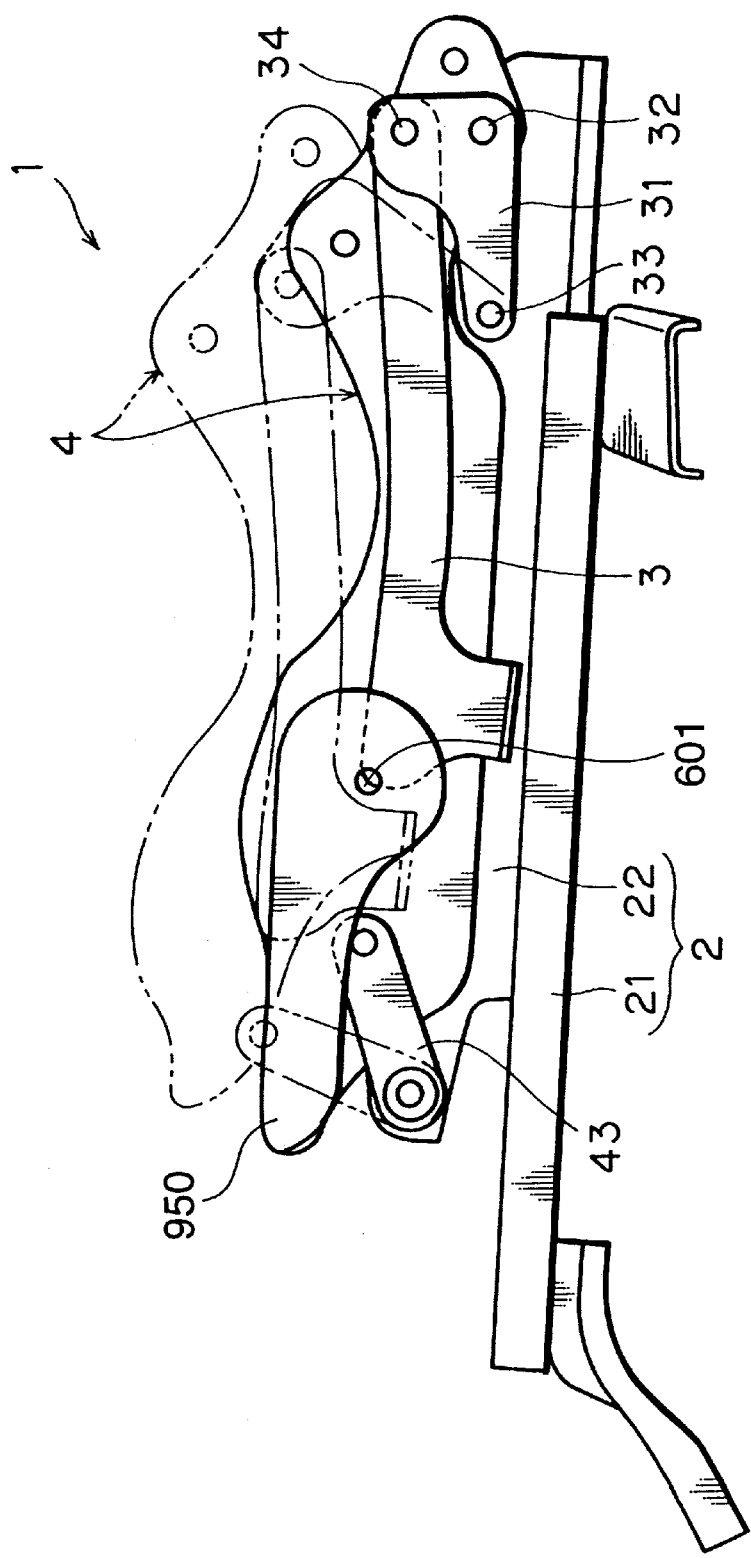
FIG. 3 is a schematic side view of the seat elevation adjuster.

Referring to FIGS. 1 to 3 in which a seatback frame is not illustrated, a seat elevation adjuster 1 basically comprises a pair of slide adjusters 2 provided at the left and right, a link rod 3 connected to one slide adjuster 2, and a pair of side frames 4 provided at the left and right, forward and rear ends of the side frames 4 being linked to the slide adjusters 2 and the link rod 3, respectively. An actuator mechanism 50 is provided on one of the slide adjusters 2 (left side as illustrated in FIGS. 1 and 2).

Each of the slide adjusters 2 includes a lower channel 21 fixed to a floor and an upper channel 22 supported by the lower channel 21 slidably in forward and backward directions. There is provided an unillustrated lock mechanism between the lower channel 21 and the upper channel 22 of each slide adjuster 2. While the upper channel 22 of each slide adjuster 2 usually remains locked in a fixed position, it is allowed to slide back and forth along the lower channel 21 when the lock mechanism is unlocked.

The link rod 3, which is in the form of a plate, moves forward and rearward, and thereby causes the side frames 4 to ascend and descend when the aforementioned actuator mechanism 50 is operated. A forward end of the link rod 3 is supported by the actuator mechanism 50 and a rear end of the link rod 3 is linked to a bell crank 31 which has a generally V-shaped structure in side view. The bell crank 31 is supported by its angled portion rotatably about a rear supporting rod 32 which is installed crosswise between the rear ends of the left and right side frames 4. One arm of the bell crank 31 extending forward from the position of the rear supporting rod 32 is supported rotatably about a pin 33 fitted to a rear portion of the left-hand upper channel 22. The link rod 3 is supported by its rear end rotatably about a pin 34.

With this arrangement, when the link rod 3 is moved forward and rearward by operating the actuator mechanism 50, the bell crank 31 turns in its forward and reverse directions about the pin 34. As a result, a rear portion of the left-hand side frame 4 is caused to ascend and descend via the rear supporting rod 32.

A right-hand end (left side as illustrated in FIGS. 1 and 2) of the rear supporting rod 32 slidably passes through a rear portion of a crank member 35 and rotatably joined to the rear end of the right-hand side frame 4. On the other hand, the crank member 35 is supported by its forward portion rotatably about another pin 33 provided on the right-hand upper channel 22, whereby the left and right side frames 4 are linked to each other. Thus, when the left-hand side frame 4 moves upward and downward, the right-hand side frame 4 is caused to move upward and downward in synchronism through the bell crank 31, the rear supporting rod 32 and the crank member 35.

The left and right side frames 4 for supporting an unillustrated seat bottom S each have front and rear support brackets 41 projecting inward from left and right sides. The two side frames 4 are fitted at their forward portions with link arms 43 which are mounted rotatably on respective pins 42.

The link arms 43 are mounted rotatably about a front supporting rod 23 installed crosswise between forward ends of the left and right upper channels 22. With this arrangement, a rectangular link mechanism is formed by the side frame 4, the link arm 43, the upper channel 22 and the bell crank 31 on the left side of the seat elevation adjuster 1 while another rectangular link mechanism is formed the side frame 4, the link arm 43 and the crank member 35 on the right side of the seat elevation adjuster 1. When the link rod 3 is moved forward and rearward, these rectangular link mechanisms work to move the left and right side frames 4 up and down.

Figure 4:
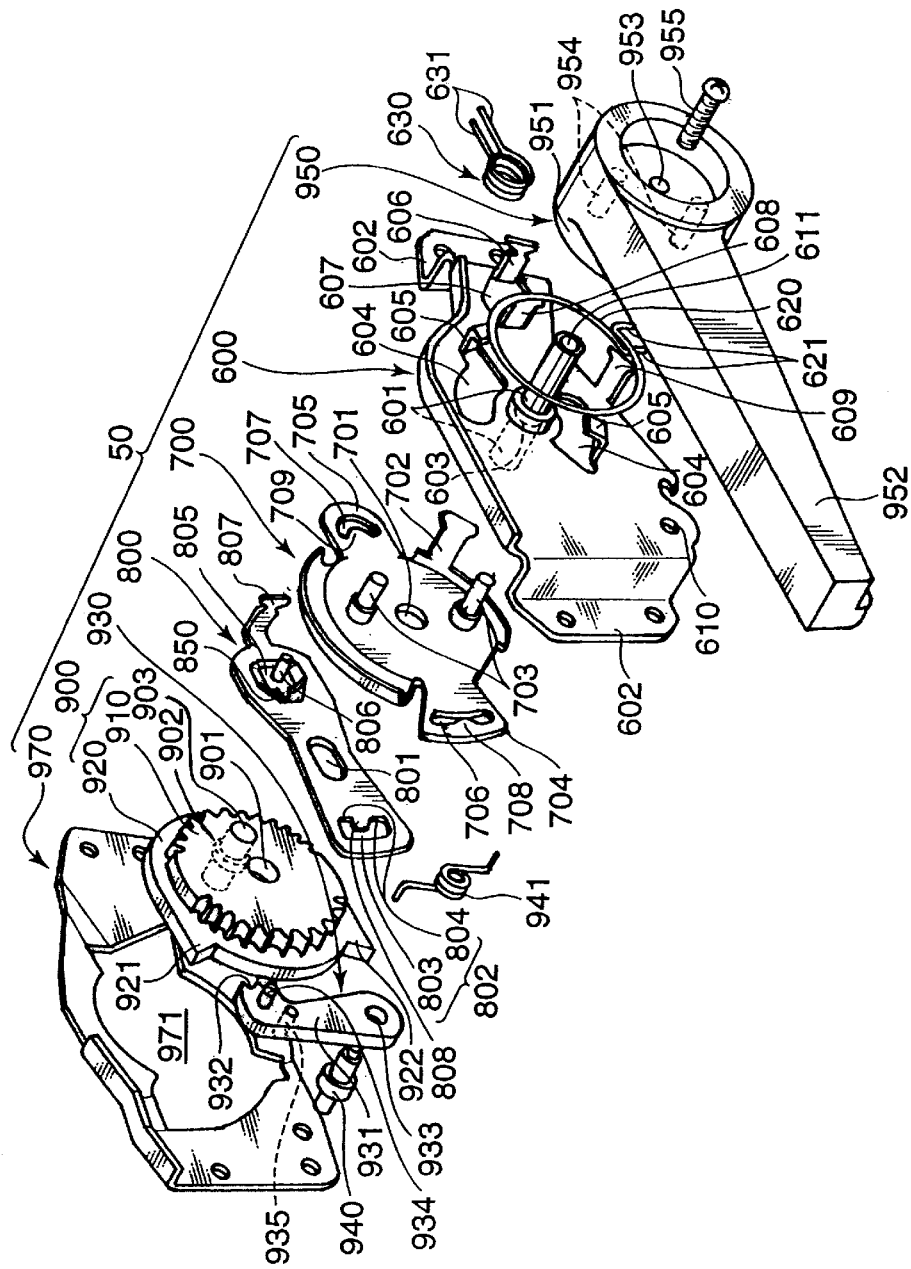
FIG. 4 is an exploded perspective view of an actuator mechanism provided in the seat elevation adjuster.

The actuator mechanism 50 is installed on the side frame 4 on one side (left side) of the seat elevation adjuster 1. FIG. 4 is an exploded perspective view of the actuator mechanism 50, FIG. 5 is a perspective assembly diagram of the actuator mechanism 50, and FIG. 6 is a side view of a driver member 800.

Figure 5:
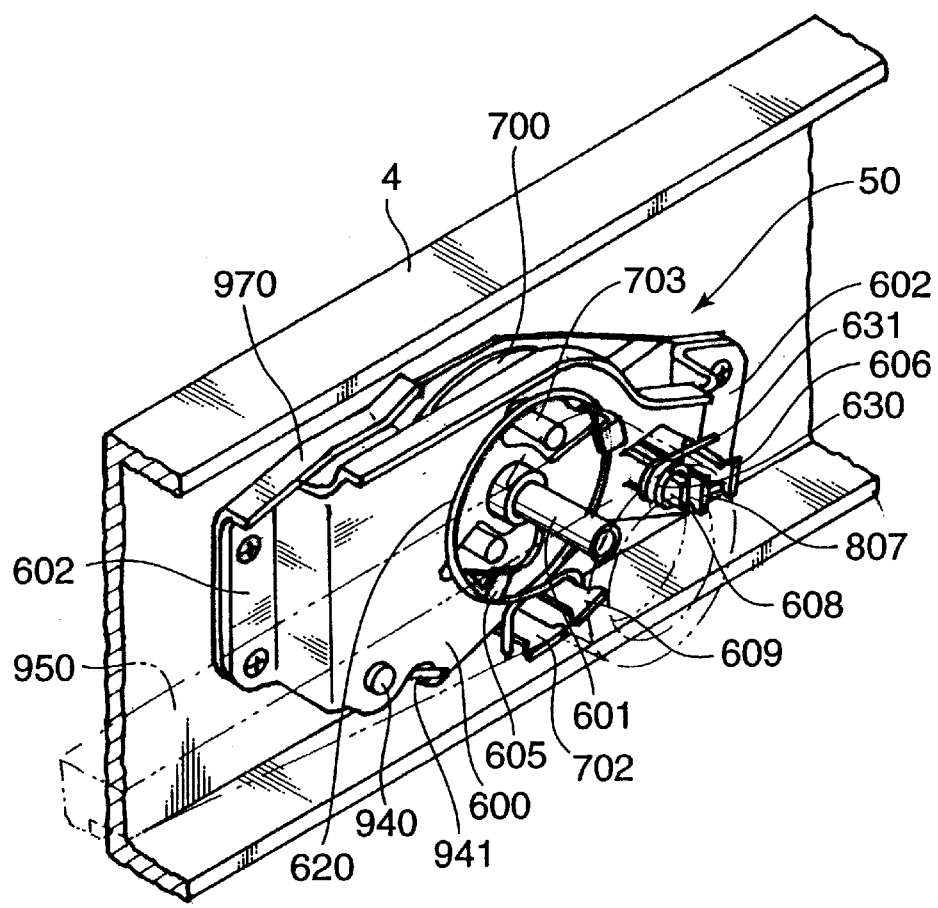
FIG. 5 is a perspective view of the actuator mechanism in an assembled state.
Figure 6:
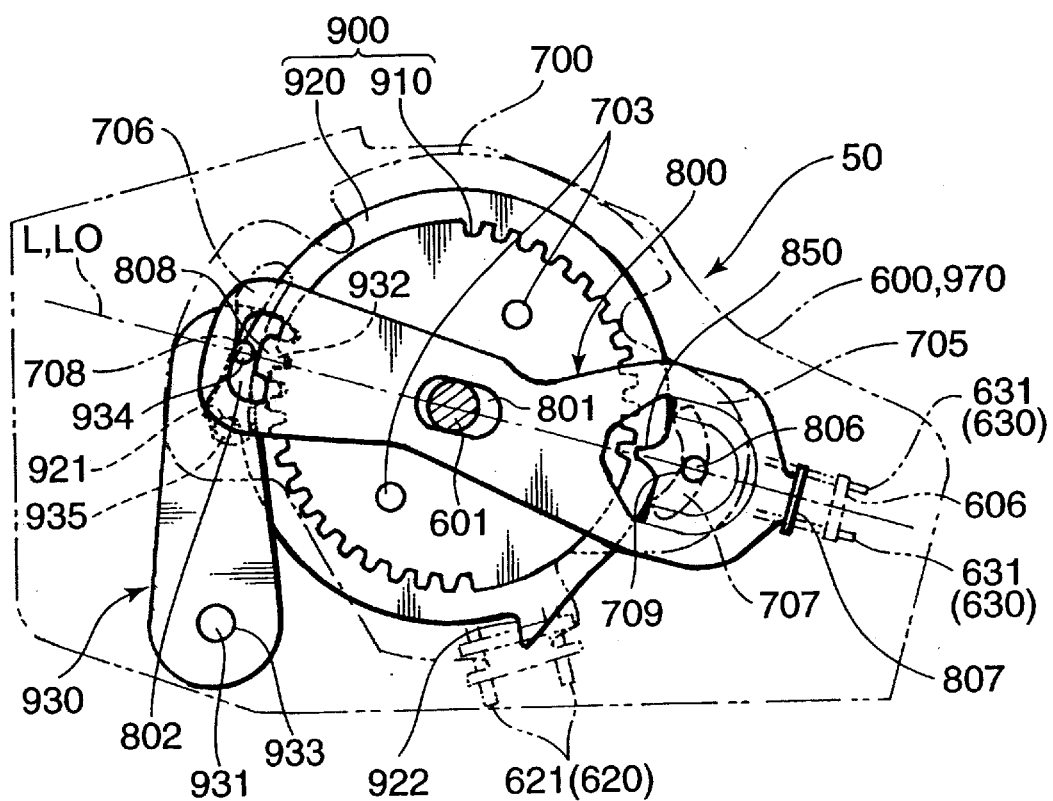
FIG. 6 is a side view of the actuator mechanism.

As depicted in FIGS. 4–6, the actuator mechanism 50 includes a attachment member 600 having at its approximately central position a center shaft 601 which is fixed to the left-hand side frame 4, a controlling member 700 placed side by side with the attachment member 600, the aforementioned driver member 800 placed side by side with the controlling member 700, a rotary member 900 placed next to the driver member 800 with a small gap therefrom, a locking member 930 attached to the attachment member 600 in such a way that the locking member 930 meshes with the rotary member 900 via the driver member 800, a feed projection 850 formed on the driver member 800 so as to be located opposite the locking member 930, an actuating lever 950 which is operated to rotate the controlling member 700 and the driver member 800 around the center shaft 601 such that the rotary member 900 turns in incremental steps as a result of lock-and-release action of the locking member 930 and the feed projection 850, and a cover member 970 fitted to the attachment member 600 with the controlling member 700, the driver member 800 and the rotary member 900 inside.

The aforementioned attachment member 600 is an odd-shaped element elongate in a front-to-back direction. The attachment member 600 has a pair of stepped flanges 602 at its forward and rear ends formed by bending forward and rear end portions of the attachment member 600 in steplike fashion. The actuator mechanism 50 is attached to the left-hand side frame 4 by fixing these stepped flanges 602 by screws to an appropriate position on the left-hand side frame 4 with the cover member 970 placed in between as shown in FIG. 1. The distance between the front and rear stepped flanges 602 is such that it allows the driver member 800 and the locking member 930 to move within a specific range.

In a central portion of the attachment member 600, there is formed a center hole 603 for passing and fixing the center shaft 601 approximately at the central position of the attachment member 600. The center shaft 601 is inserted into the center hole 603 up to the middle of its length and fixed in the center hole 603 by welding or caulking, so that the center shaft 601 extends to both sides of the attachment member 600. The actuating lever 950 is fitted over an externally projecting portion of the center shaft 601, and the controlling member 700, the driver member 800 and the rotary member 900 are slidably and rotatably fitted on an internally projecting portion of the center shaft 601. A pair of first cut-out holes 604 are formed in the attachment member 600 diagonally above and beneath the center hole 603. These first cut-out holes 604 have arc-shaped patterns elongated along a circle drawn around the center shaft 601.

The attachment member 600 has a pair of externally extending first projecting parts 605 opposed to each other which are formed along outer edges of the arc-shaped first cut-out holes 604. At the back of the first cut-out holes 604 (right side as illustrated in FIG. 4), there are formed a second projecting part 606 and a third projecting part 608 extending outward (toward the actuating lever 950) from the attachment member 600, the second and third projecting parts 606, 608 facing each other along the front-to-back direction. A hole made in the attachment member 600 by cutting the second and third projecting parts 606, 608 is enlarged to form a second cut-out hole 607. Further, there is formed a fourth projecting part 609 extending outward from a lower edge of the attachment member 600.

The controlling member 700 formed into a generally circular shape has a center hole 701 formed at its central position to match the location of the center hole 603 in the attachment member 600. The center shaft 601 fixed to the attachment member 600 is slidably fitted into the center hole 701, so that the controlling member 700 can rotate around the center shaft 601 between the front and rear stepped flanges 602.

The controlling member 700 has a fifth projecting part 702 formed by cutting and raising its forward portion (left side as illustrated in FIG. 4) at a location corresponding to the position of the fourth projecting part 609. When the center shaft 601 of the attachment member 600 is fitted into the center hole 701 in the controlling member 700, the fifth projecting part 702 overlaps the fourth projecting part 609.

The controlling member 700 has a pair of shafts 703 provided above and beneath the center hole 701, the locations of the shafts 703 corresponding to the positions of the first cut-out holes 604 in the attachment member 600. When the center shaft 601 of the attachment member 600 is inserted into the center hole 701 in the controlling member 700, the two shafts 703 pass through the respective first cut-out holes 604. The actuating lever 950 is fitted to outer ends of the these shafts 703.

At an extreme forward end of the controlling member 700, there is formed a forward projecting part 704 which extends forward (leftward as illustrated in FIG. 4). On the other hand, a rear projecting part 705 extending rearward is formed at an extreme rear end of the controlling member 700. There is formed a first guide hole 706 in the forward projecting part 704 while a second guide hole 707 in the form of an arc is formed in the rear projecting part 705. The first guide hole 706 has an arc-shaped form whose center of curvature matches the center of the center hole 701.

The first guide hole 706 works to engage the locking member 930 with the rotary member 900. The first guide hole 706 is shaped such that when the actuating lever 950 is set at its neutral position, the locking member 930 remains engaged with the rotary member 900 by means of a first guiding projection 934. More specifically, the radius of curvature of the first guide hole 706 is made slightly larger than the radius of the rotary member 900, and a first constricting protuberance 708 protruding rearward is formed at the middle of a front edge of the first guide hole 706. When the actuating lever 950 is moved toward its neutral position, the first constricting protuberance 708 presses part of the locking member 930 so that the locking member 930 firmly meshes with the rotary member 900.

The aforementioned second guide hole 707 causes the driver member 800 to move forward and rearward in radial directions while turning around the center shaft 601 together with the controlling member 700. The second guide hole 707 has an arc-shaped form whose center of curvature is located at a rear position on a center line drawn in a longitudinal direction of the controlling member 700, wherein a second constricting protuberance 709 protruding rearward is formed on a front edge of the second guide hole 707. With part of the driver member 800 slidably inserted in the second guide hole 707, the driver member 800 moves forward and rearward while turning around the center shaft 601 together with the controlling member 700 as the controlling member 700 rotates in its forward and reverse directions.

After the controlling member 700 has been mounted on the attachment member 600 with the center hole 701 fit over the center shaft 601, a large-diameter coil spring 620 (third springy member) fits over the two first projecting parts 605 on the attachment member 600, whereby the fourth projecting part 609 and the fifth projecting part 702 are held in their overlapped position with a biasing force of the large-diameter coil spring 620.

The large-diameter coil spring 620 has a pair of hooking ends 621 projecting radially outward formed by bending both terminal portions of the large-diameter coil spring 620. As the fourth and fifth projecting parts 609, 702 are pinched together by the hooking ends 621 of the large-diameter coil spring 620, they are held in their overlapped position by the biasing force of the large-diameter coil spring 620. With this arrangement, even if the two projecting parts 609, 702 deviate from the overlapped position when the controlling member 700 is rotated around the center shaft 601, the biasing force of the large-diameter coil spring 620 instantly brings the projecting parts 609, 702 to their overlapped position.

When the driver member 800 moves forward and rearward while turning around the center shaft 601 together with the controlling member 700, the driver member 800 causes the locking member 930 and the feed projection 850 to alternately engage with and disengage from the rotary member 900. This lock-and-release action of the locking member 930 and the feed projection 850 causes the rotary member 900 to turn in incremental steps. The driver member 800 functioning in this manner is made slightly longer than the controlling member 700.

At the midpoint of a center line L of the driver member 800, there is formed a oblong hole 801 elongated along the center line L. The width of this oblong hole 801, or the distance between opposed sides of the oblong hole 801 measured in the direction of its minor axis, is made slightly larger than the diameter of the center shaft 601, so that the driver member 800 can slide in the direction of the major axis of the oblong hole 801 (along the center line L) when the oblong hole 801 is fitted over the center shaft 601.

There is formed a C-shaped third guide hole (locking hole) 802 at a forward end portion of the driver member 800. Working in association with the first guide hole 706 and part of the locking member 930, the third guide hole 802 causes the locking member 930 to engage with and disengage from the rotary member 900. The third guide hole 802 is formed of an arc-shaped portion 803 extending along a circle whose center matches the center of the oblong hole 801 and a pair of cut-out portions 804 formed by cutting the driver member 800 from both ends of the arc-shaped portion 803 in the direction of the center of the oblong hole 801. As a result, there is formed a third constricting protuberance 808 in the third guide hole 802 protruding toward its arc-shaped portion 803 between the two cut-out portions 804.

The driver member 800 has a projecting part 805 formed by cutting and raising its rear portion in a direction opposite the controlling member 700. (Since this projecting part 805 bulges leftward as illustrated in FIG. 1, its recessed rear side can be seen in the Figure.) The aforementioned feed projection 850 is formed on a front edge of the projecting part 805 to face a circumferential surface of the rotary member 900.

The projecting part 805 is located at a position facing the rear projecting part 705 of the controlling member 700 and a guide pin 806 extending toward the second guide hole 707 in the rear projecting part 705 of the controlling member 700 is provided at the center of the projecting part 805. With this guide pin 806 fitted into the second guide hole 707, the driver member 800 moves forward and rearward as the controlling member 700 turns around the center shaft 601.

At an extreme rear end of the driver member 800, there is formed a sixth projecting part 807 at a position corresponding to the second projecting part 606 of the attachment member 600. The physical size of the sixth projecting part 807 is such that it passes through the second cut-out hole 607 and is positioned face to face with the second projecting part 606 when the controlling member 700 and the driver member 800 have been fitted to the attachment member 600 in this order.

With the second projecting part 606 and the sixth projecting part 807 set in position to face each other in this fashion, a medium-diameter coil spring 630 is fitted on the second projecting part 606 and the sixth projecting part 807. As a result, the second projecting part 606 and the sixth projecting part 807 are fastened together by a biasing force of the medium-diameter coil spring 630. Specifically, the medium-diameter coil spring 630 has a pair of hooking ends (second springy members) 631 extending in the same direction. When the medium-diameter coil spring 630 fitted on the third projecting part 608, a longer one of its hooking ends 631 is hooked on the second projecting part 606 and the other is hooked on the sixth projecting part 807, whereby the second projecting part 606 and the sixth projecting part 807 are clamped together.

The aforementioned rotary member 900 includes a rotary member wheel 910 having teeth formed on its circumferential surface and a disk 920 placed immediately on one side of the rotary member wheel 910. There is formed a center hole 901 at the center of the rotary member 900 for slidably inserting the center shaft 601. The teeth of the rotary member wheel 910 are formed in working areas of its circumferential surface which are located symmetrically about the center hole 901. A force-fitting hole 902 is formed at an appropriate position of the rotary member 900 and a link shaft 903 is forcibly fitted into the force-fitting hole 902. The link shaft 903 is linked to the forward end of the link rod 3 (FIG. 1). As the rotary member 900 rotates in its forward and reverse directions around the center shaft 601, the link rod 3 moves forward and rearward and, as a consequence, the bell crank 31 turns in its forward and reverse directions about the pin 33, thereby causing the side frames 4 to move up and down.

The disk 920 of the rotary member 900 is provided with a pair of stoppers (an upper stopper 921 and a lower stopper 922) formed by extending a circumferential surface of the disk 920 from its upper and lower portions in tangential directions rearward. These stoppers 921, 922 interfere with the locking member 930 and thereby serve to define a range of rotary motion of the rotary member 900.

An upper part of the locking member 930 overlaps the controlling member 700 and the driver member 800 which are placed on the attachment member 600. The locking member 930 has a vertically elongate platelike body 931 and locking teeth 932 formed on an upper edge of the platelike body 931 facing the rotary member wheel 910. A shaft hole 933 in which the center shaft 601 is fitted is formed in a lower portion of the platelike body 931.

The earlier-mentioned first guiding projection 934 which is fitted into the third guide hole 802 in the driver member 800 and the first guide hole 706 in the controlling member 700 is projectingly formed on one side (right side as illustrated in FIG. 4) of the platelike body 931 of the locking member 930. On the opposite side of the platelike body 931, there is formed a second guiding projection 935 which interferes with the aforementioned stoppers 921, 922 slightly below the first guiding projection 934. The range of rotary motion of the rotary member 900 is defined as the stoppers 921, 922 go into contact with the second guiding projection 935.

On the other hand, there is formed a shaft hole 610 for supporting and fixing a locking member support shaft 940 in a lower portion of the attachment member 600 slightly to the back of the front stepped flange 602. The locking member support shaft 940 is inserted into the shaft hole 610 and fixed therein by flattening the head of the locking member support shaft 940. The locking member 930 is mounted on the attachment member 600 by slidably fitting the locking member support shaft 940 in the shaft hole 933 of the locking member 930.

A small-diameter coil spring (first springy member) 941 is fitted on the locking member support shaft 940. One end of the elastically deformed small-diameter coil spring 941 is hooked on an upper part of a front edge of the locking member 930 while the other end of the small-diameter coil spring 941 is hooked on a lower edge of the locking member 930. With this arrangement, the small-diameter coil spring 941 exerts a biasing force which causes the locking member 930 to turn clockwise around the locking member support shaft 940. This causes the locking teeth 932 to mesh with the rotary member wheel 910 when the controlling member 700 and the driver member 800 are set at their neutral positions.

The aforementioned actuating lever 950 is gripped and operated by the seated person when adjusting the elevation of the seat bottom S. The actuating lever 950 is formed of a cylindrical portion 951 having a shaft hole 953 which is fitted onto the center shaft 601 and a handle lever 952 integrally formed with the cylindrical portion 951. A threaded hole 611 is formed in the center shaft 601 along its axis from its outer end surface.

There are formed two mounting holes 954 in the cylindrical portion 951 of the actuating lever 950. The positions of these mounting holes 954 match the locations of the shafts 703 formed on the controlling member 700 when the shaft hole 953 is fitted onto the center shaft 601. After fitting the shafts 703 and the center shaft 601 into the mounting holes 954 and the shaft hole 953, respectively, a fixing screw 955 is tightened into the threaded hole 611 to fix the actuating lever 950 to the attachment member 600 and the controlling member 700.

If the handle lever 952 is turned about the center shaft 601 in forward and reverse directions with the actuating lever 950 attached to the attachment member 600, the controlling member 700 is caused via the shafts 703 to rotate around the center shaft 601 in the forward and reverse directions. This rotary motion of the controlling member 700 causes the driver member 800 to produce rotary motion while moving forward and rearward. This causes the third guide hole 802 and the feed projection 850 to alternately engage with and disengage from the rotary member wheel 910, whereby the rotary member 900 rotates in a specific direction around the center shaft 601.

The cover member 970 serves to prevent the controlling member 700 fitted on the center shaft 601 of the attachment member 600, the driver member 800, the rotary member 900 and the locking member 930 from coming apart. At a central position of the cover member 970, there is formed a restraining hole 971 whose diameter is slightly smaller than that of the disk 920 of the rotary member 900. The restraining hole 971 prevents the rotary member 900 from coming off as an inner edge portion of the restraining hole 971 comes in contact with a peripheral portion of the disk 920. The cover member 970 is fixed to the left-hand side frame 4 by screws as shown in FIG. 5 with the stepped flanges 602 of the attachment member 600 placed directly on forward and rear end portions of the cover member 970, whereby the actuator mechanism 50 is installed on the seat elevation adjuster 1.

In order to link the link shaft 903 to the forward end of the link rod 3 with the actuator mechanism 50 attached to the left-hand side frame 4, there is formed an arcuate hole 44 in the left-hand side frame 4. The arcuate hole 44 has an arc-shaped form matching an arc-shaped path of the link shaft 903. Further, a cut-out hole 45 which allows the center shaft 601 to pass through is formed in the left-hand side frame 4 at the center of the arc shape of the arcuate hole 44.

As the rotary member 900 rotates in its forward and reverse directions around the center shaft 601, the link shaft 903 linked to the forward end of the link rod 3 of FIG. 1 swings forward and rearward around the center shaft 601. The swing motion of the link shaft 903 is transmitted to the link rod 3, causing it to move forward and rearward. As a result, the bell crank 31 turns in its forward and reverse directions about the pin 33 and the side frames 4 move up and down, whereby the elevation of the seat bottom S is adjusted.

Operation of the actuator mechanism 50 is now described referring to FIGS. 7A–7F as well as to FIGS. 1–6 where necessary. FIGS. 7A–7D are diagrams showing how the rotary member 900 rotates around the center shaft 601 through cooperative operation of the locking member 930 and the feed projection 850.

The driver member 800 is normally held at its neutral position by the biasing force of the large-diameter coil spring 620. In the neutral position, as shown in FIG. 6, the driver member 800 extends forwardly up and backwardly down. In this state, the first guiding projection 934 of the locking member 930 is located at a central point of the third guide hole 802 in the driver member 800 as well as at a central point of the first guide hole 706 in the controlling member 700 and is retained in this position by the third constricting protuberance 808 and the first constricting protuberance 708. Under these conditions, the guide pin 806 fitted in the second guide hole 707 is located at a central point of the second guide hole 707 in the controlling member 700 and guided by the second constricting protuberance 709, so that the driver member 800 is displaced rearward and the first guiding projection 934 is forced against a front edge of the third guide hole 802. Thus, the locking teeth 932 of the locking member 930 are meshed with the rotary member wheel 910 and the feed projection 850 is disengaged from the rotary member 900 under normal conditions.

Since the locking member 930 is normally engaged with the rotary member 900 as stated above, the rotary member 900 is locked and kept from turning around the center shaft 601, 50 that the side frames 4 are maintained at its set elevation. Under these conditions, the center line L of the driver member 800 matches its neutral line L0.

Figure 7A:
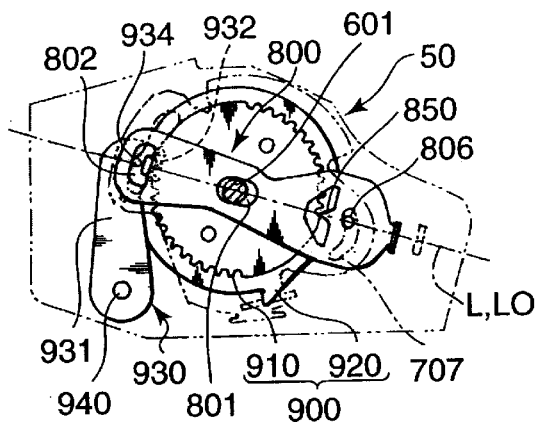
FIGS. 7A–7F are diagrams showing positional relationships between a rotary member, a locking member, and a driver member.
Figure 7B:
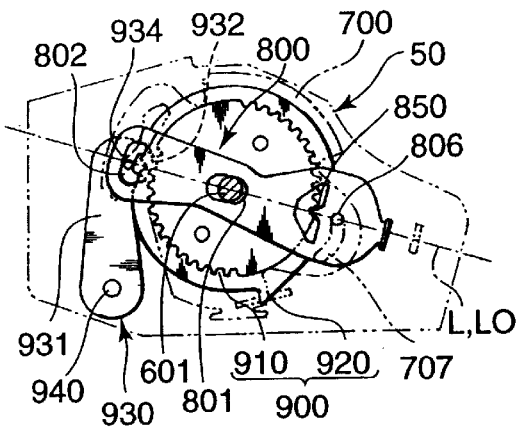

If the actuating lever 950 is lifted upward in this state, the controlling member 700 rotates clockwise around the center shaft 601 as shown in FIG. 7A. With the guide pin 806 forced against a rear edge of the second guide hole 707, the driver member 800 is kept from rotating by the biasing force of the medium-diameter coil spring 630 (that is, because one hooking end 631 of the medium-diameter coil spring 630 is hooked on the sixth projecting part 807 of the driver member 800 and the other hooking end 631 is hooked on the second projecting part 606 of the attachment member 600). Since the driver member 800 moves forward (leftward as illustrated in FIG. 7A) in this state, the locking teeth 932 are gradually disengaged from the rotary member wheel 910 and, on the other hand, the feed projection 850 gradually meshes with the rotary member wheel 910. If the actuating lever 950 is lifted further upward, the locking member 930 is completely disengaged from the rotary member 900 as depicted in FIG. 7B.

Figure 7C:
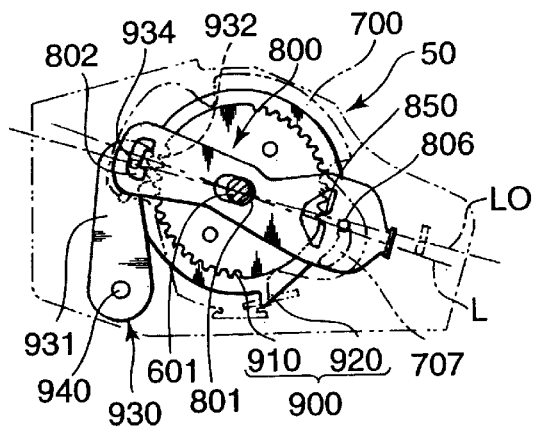

If the driver member 800 is turned further clockwise around the center shaft 601 by lifting the actuating lever 950 further upward, the guide pin 806 goes into contact with an upper portion of the second guide hole 707 as shown in FIG. 7C, whereby the rotary member 900 rotates clockwise around the center shaft 601, causing the side frames 4 to move upward.

Figure 7D:
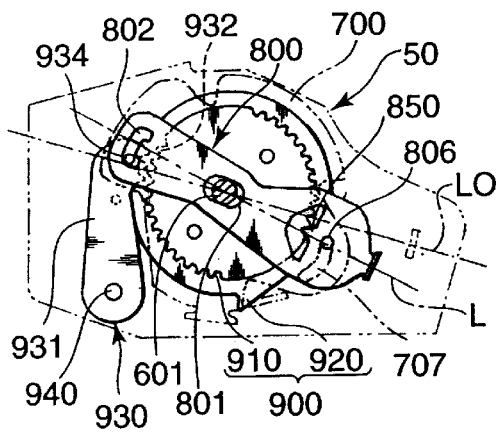

If the driver member 800 is turned further clockwise around the center shaft 601 by lifting the actuating lever 950 up to its uppermost position, the rotary member 900 meshed with the feed projection 850 rotates clockwise around the center shaft 601 by as much as one tooth as shown in FIG. 7D. At this point, the first guiding projection 934 slips into the lower cut-out portion 804 in the third guide hole 802.

Figure 7E:
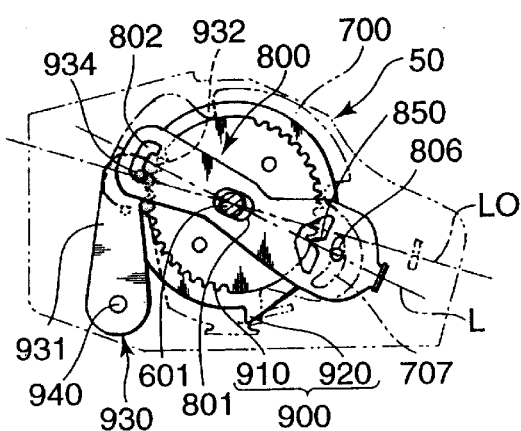
Figure 7F:
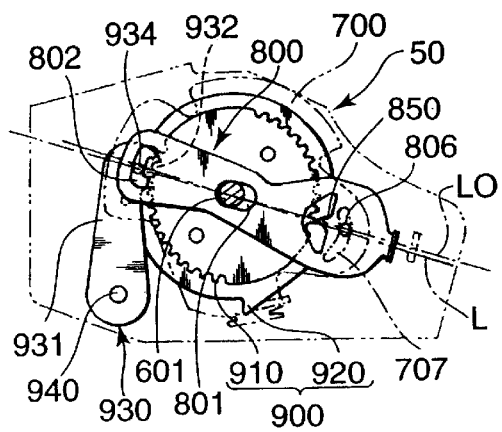
Figure 8:
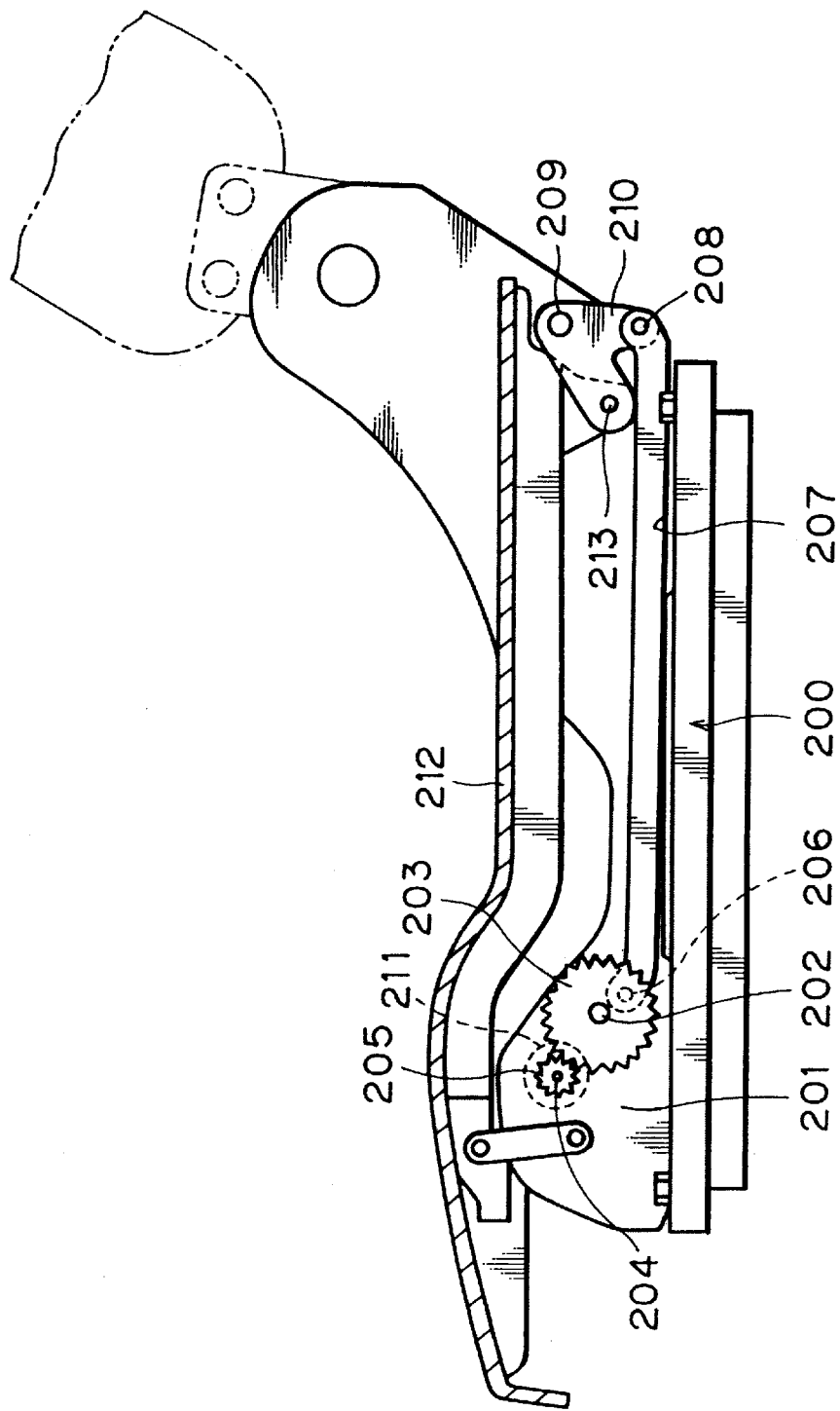
FIG. 8 is a side view of a conventional seat elevation adjuster.

Referring next to FIGS. 7E and 7F, the following paragraphs describe how the actuator mechanism 50 works when the actuating lever 950 is moved downward from its uppermost position. If the controlling member 700 is rotated counterclockwise around the center shaft 601 from the position shown in FIG. 7D by manipulating the actuating lever 950, the biasing force of the medium-diameter coil spring 630 exerted on the driver member 800 works to bring it back to its neutral position and, therefore, the driver member 800 rotates together with the actuating lever 950.

When the driver member 800 rotates counterclockwise around the center shaft 601, the guide pin 806 is pushed rearward by the second constricting protuberance 709 in the second guide hole 707 as shown in FIG. 7E. Thus, the feed projection 850 is gradually disengaged from the rotary member wheel 910 while the first guiding projection 934 is forced rearward by the front edge of the first guide hole 706. As a consequence, the locking teeth 932 of the locking member 930 gradually engage with the rotary member wheel 910 as shown in FIG. 7F.

When the driver member 800 is returned to its original neutral position by moving the actuating lever 950 down to its neutral position, the locking member 930 returns to its original position shown in FIG. 6 where it is engaged with the rotary member wheel 910. In this embodiment, the handle lever 952 automatically descends, or returns to original position, when released. The handle lever 952 is brought back to its neutral position in this manner together with the controlling member 700 by the biasing force of the large-diameter coil spring 620 whose hooking ends 621 are hooked on the fourth and fifth projecting parts 609, 702.

It would be understood from the foregoing that the rotary member 900 rotates clockwise around the center shaft 601 in progressive steps if the actuating lever 950 is repetitively lifted upward to reciprocally rotate the driver member 800 around the center shaft 601 in such a manner that a forward portion of the driver member 800 is lifted above the neutral line L0. The side frames 4 gradually ascend when the actuating lever 950 is operated in this way.

Conversely, if the driver member 800 is reciprocally rotated in such a manner that its forward portion is forced below the neutral line L0 by manipulating the actuating lever 950, the rotary member 900 rotates counterclockwise around the center shaft 601 and, as a consequence, the side frames 4 are caused to gradually descend.

According to the invention so far described in detail, the elevation of a seat progressively increases if the actuating lever 950 is repeatedly lifted upward from its horizontal neutral position whereas the elevation of the seat progressively decreases if the actuating lever 950 is repeatedly moved downward. Compared to the earlier-described conventional arrangement employing an actuating knob, the actuator mechanism 50 is easy to operate and facilitates adjustment of the elevation of the seat.

The actuator mechanism 50 does not employ a conventionally used brake drum having a complicated construction, thus reducing the number of components and man-hours required for assembly, as well as manufacturing costs.

Although the feed projection 850 has only one tooth for pushing and rotating the rotary member 900 in the present embodiment, the feed projection 850 is not limited to one-tooth type but may be a gear having multiple teeth.

As described above, an inventive actuator mechanism for use in a seat elevation adjuster, comprising a rotary member which is rotatable in the opposite directions about a center axis to actuate the seat elevation adjuster; a locking member which is engageable with the rotary member to keep the rotary member from rotating, and is disengageable from the rotary member to allow the rotary member to rotate; a driver member which is rotatable about the center axis, and is movable in a first direction perpendicularly intersecting the center axis and a second direction opposite to the first direction, and is engageable with the rotary member. The driver member makes the locking member to engage with the rotary member, and disengages from the rotary member when moved in the first direction, and makes the locking member to disengage from the rotary member, and engages with the rotary member when moved in the second direction to thereby allow the rotary member to rotate with a rotation of the driver member to actuate the seat elevation adjuster.

The rotary member may have a disk portion which is formed with teeth in a periphery of the disk portion. In this case, it may be preferable to form the driver member with a feed projection engageable with the teeth of the rotary member, and to form the locking member with teeth engageable with the teeth of the rotary member.

The feed projection of the driver member may be located in an opposite position against the locking member with respect to the center axis.

Further, there may be provided a biasing member which urges the driver member in the second direction; and a controlling member which controls the movement of the driver member, and has a first position of keeping the driver member from moving in the second direction, and a second position of allowing the driver member to move in the second direction.

More preferably, it may be appreciated to provide the driver member with a pin, and provide a controlling member formed with a guide hole engageable with the pin.

The actuator mechanism may be further provided with a biasing member which urges the locking member toward the rotary member. In this case, the locking member may be preferably made to be swingable about a pivot, and formed with a pin. The driver member may be formed with a guide hole engageable with the pin of the locking member. Thereby, the locking member swings with a movement of the driver member by the way of engagement between the guide hole and the pin of the locking member.

Further, it may be preferable to shape the driver member into the form of a plate, and form an oblong hole for passing the center axis in the plate.

Furthermore, it may be preferable to further provide a biasing member which urges the controlling member to the first position.

In the construction, the rotary member for actuating the seat elevation adjuster is switched over from the locking state where the locking member engages with the rotary member and the driver member disengages from the rotary member to the actuating state where the locking member disengages from the rotary member and the driver member engages with the rotary member, and vice versa merely by the movement of the driver member. The seat elevation adjuster is actuated by rotating the driver member. This construction makes the operation much easier than the conventional seat elevation adjuster, and also provides much simplified construction.

Specifically, the controlling member set at the first position is repetitively forced in one direction (upward or downward) from the first position so that the driver member moves reciprocally, its reciprocal movement is transmitted to the locking member and the feed projection. As a result, the locking member produces an interlocked lock-and-release action with the rotary member, that is, the locking member is repetitively disengaged from the rotary member and engaged with the rotary member as a result of the reciprocal movement of the driver member. When the feed projection is engaged with the rotary member and the locking member is disengaged from the rotary member, the rotary member is caused to rotate in the forward or backward direction together with the driver member, resulting in an increase or a decrease in the elevation of the seat.

The driver member is formed with the feed projection integrally. Accordingly, the mechanism for rotating the rotary member is simplified compared to a conventional arrangement in which a feed gear provided separately from the driver member is engaged with and disengaged from the driver member by their interlocked operation.

This application is based on patent application No. 2000-197700 filed in Japan, the contents of which are hereby incorporated by references.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within metes and bounds of the claims, or equivalence of such metes and bounds are therefore intended to embraced by the claims.

What is claimed is:

1. An actuator mechanism for use in a seat elevation adjuster, comprising:
   a rotary member which is rotatable in the opposite directions about a center axis to actuate the seat elevation adjuster;
   a locking member which is engageable with the rotary member to keep the rotary member from rotating, and is disengageable from the rotary member to allow the rotary member to rotate;
   a driver member which is rotatable about the center axis, and is movable in a first direction perpendicularly intersecting the center axis and a second direction opposite to the first direction, and is engageable with the rotary member, the driver member:
      making the locking member to engage with the rotary member, and disengaging from the rotary member when moved in the first direction; and
      making the locking member to disengage from the rotary member, and engaging with the rotary member when moved in the second direction, whereby the rotary member is rotatable with a rotation of the driver member to actuate the seat elevation adjuster.

2. An actuator mechanism for use in a seat elevation adjuster comprising:
   a rotary member which is rotatable in the opposite directions about a center axis to actuate the seat elevation adjuster;
   a locking member which is engageable with the rotary member to keep the rotary member from rotating, and is disengageable from the rotary member to allow the rotary member to rotate;
   a driver member which is rotatable about the center axis, and is movable in a first direction perpendicularly intersecting the center axis and a second direction opposite to the first direction, and is engageable with the rotary member, the driver member:
      making the locking member to engage with the rotary member, and disengaging from the rotary member when moved in the first direction; and
      making the locking member to disengage from the rotary member, and engaging with the rotary member when moved in the second direction, whereby the rotary member is rotatable with a rotation of the driver member to actuate the seat elevation adjuster, wherein:
         the rotary member has a disk portion, and has teeth in a periphery of the disk portion;
         the driver member has a feed projection engageable the teeth of the rotary member; and
         the locking member has teeth engageable with the teeth of the rotary member.

3. An actuator mechanism for use in a seat elevation adjuster according to claim 2, wherein the feed projection of the driver member is in an opposite position against the locking member with respect to the center axis.

4. An actuator mechanism for use in a seat elevation adjuster according to claim 3, further comprising:
   a biasing member which urges the driver member in the second direction; and
   a controlling member which controls the movement of the driver member, and has a first position of keeping the driver member from moving in the second direction, and a second position of allowing the driver member to move in the second direction.

5. An actuator mechanism for use in a seat elevation adjuster according to claim 4, wherein:
   the driver member has a pin;
   the controlling member is rotatable about the center axis, and has a guide hole engageable with the pin.

6. An actuator mechanism for use in a seat elevation adjuster according to claim 5, further comprising a biasing member which urges the locking member toward the rotary member, wherein:
   the locking member is swingable about a pivot, and has a pin; and
   the driver member has a guide hole engageable with the pin of the locking member,
   whereby the locking member swings with a movement of the driver member by the way of engagement between the guide hole and the pin of the locking member.

7. An actuator mechanism for use in a seat elevation adjuster according to claim 6, wherein the driver member is in the form of a plate, and has an oblong hole for passing the center axis.

8. An actuator mechanism for use in a seat elevation adjuster according to claim 7, further comprising a biasing member which urges the controlling member to the first position.

9. An actuator mechanism for use in a seat elevation adjuster according to claim 3, further comprising a biasing member which urges the locking member toward the rotary member, wherein:
   the locking member is swingable about a pivot, and has a pin; and
   the driver member has a guide hole engageable with the pin of the locking member,
   whereby the locking member swings with a movement of the driver member by the way of engagement between the guide hole and the pin of the locking member.

10. An actuator mechanism for use in a seat elevation adjuster, comprising:
    actuating means rotatable in opposite directions about an axis for actuating the seat elevation adjuster;
    locking means engageable with the actuating means for keep the actuating means from operating, and disengageable from the actuating means to allow the actuating means to operate;
    driver means rotatable about the axis and movable in a first direction perpendicularly intersecting the axis and a second direction opposite to the first direction, and the driver means being engageable with the actuating means for making the locking means engage with the actuating means, and being disengageable from the actuating means when moved in the first direction, and the driver means making the locking means disengage from the actuating means, and engage with the actuating means when moved in the second direction, whereby the actuating means is operable to actuate the seat elevation adjuster with an operation of the driver means.

11. A seat elevation adjuster, comprising
    a seat support frame which supports a seat;
    an elevation mechanism which moves the seat support frame up and down; and
    an actuator mechanism which actuates the elevation mechanism, the actuator mechanism including:
       a rotary member which is rotatable in the opposite directions about a center axis and operatively connected with the elevation mechanism;
       a locking member which is engageable with the rotary member to keep the rotary member from rotating, and is disengageable from the rotary member to allow the rotary member to rotate;
       a driver member which is rotatable about the center axis, and is movable in a first direction perpendicularly intersecting the center axis and a second direction opposite to the first direction, and is engageable with the rotary member, the driver member:
          making the locking member to engage with the rotary member, and disengaging from the rotary member when moved in the first direction; and
          making the locking member to disengage from the rotary member, and engaging with the rotary member when moved in the second direction, whereby the rotary member is rotatable with a rotation of the driver member to actuate the seat elevation adjuster.

12. A seat elevation adjuster comprising:
    a seat support frame which supports a seat;
    an elevation mechanism which moves the seat support frame up and down; and
    an actuator mechanism which actuates the elevation mechanism, the actuator mechanism including:

a rotary member which is rotatable in the opposite directions about a center axis and operatively connected with the elevation mechanism;

a locking member which is engageable with the rotary member to keep the rotary member from rotating, and is disengageable from the rotary member to allow the rotary member to rotate;

a driver member which is rotatable about the center axis, and is movable in a first direction perpendicularly intersecting the center axis and a second direction opposite to the first direction, and is engageable with the rotary member, the driver member:

making the locking member engage with the rotary member, and disengaging from the rotary member when moved in the first direction; and making the locking member disengage from the rotary member, and engaging with the rotary member when moved in the second direction, whereby the rotary member is rotatable with a rotation of the driver member to actuate the seat elevation adjuster, wherein:

the rotary member has a disk portion, and has teeth in a periphery of the disk portion;

the driver member has a feed projection engageable the teeth of the rotary member; and the locking member has teeth engageable with the teeth of the rotary member.

13. A seat elevation adjuster according to claim 12, wherein the feed projection of the driver member is in an opposite position against the locking member with respect to the center axis.

14. A seat elevation adjuster according to claim 13, further comprising:

a biasing member which urges the driver member in the second direction; and a controlling member which controls the movement of the driver member, and has a first position of keeping the driver member from moving in the second direction, and a second position of allowing the driver member to move in the second direction.

15. A seat elevation adjuster according to claim 14, wherein:

the driver member has a pin;

the controlling member is rotatable about the center axis, and has a guide hole engageable with the pin.

16. A seat elevation adjuster according to claim 15, further comprising a biasing member which urges the locking member toward the rotary member, wherein:

the locking member is swingable about a pivot, and has a pin; and the driver member has a guide hole engageable with the pin of the locking member, whereby the locking member swings with a movement of the driver member by the way of engagement between the guide hole and the pin of the locking member.

17. A seat elevation adjuster according to claim 16, wherein the driver member is in the form of a plate, and has an oblong hole for passing the center axis.

18. A seat elevation adjuster according to claim 17, further comprising a biasing member which urges the controlling member to the first position.

19. A seat elevation adjuster according to claim 18, further comprising a biasing member which urges the locking member toward the rotary member, wherein:

the locking member is swingable about a pivot, and has a pin; and the driver member has a guide hole engageable with the pin of the locking member, whereby the locking member swings with a movement of the driver member by the way of engagement between the guide hole and the pin of the locking member.

20. A seat elevation adjuster, comprising seat supporter means for supporting a seat;

elevating means for moving the seat supporter means up and down; and actuator means for actuating the elevating means, the actuator means including:

actuating means rotatable in opposite directions about an axis for actuating the elevating means;

locking means engageable with the actuating means for keep the actuating means from operating, and disengageable from the actuating means to allow the actuating means to operate;

driver means rotatable about the axis and movable in a first direction perpendicularly intersecting the axis and a second direction opposite to the first direction, and the driver means being engageable with the actuating means for making the locking means engage with the actuating means, and disengageable from the actuating means when moved in the first direction, and the driver means making the locking means disengage from the actuating means, and engage with the actuating means is operable to actuate the elevating means with an operation of the driver means.

* * * * *